March 10, 1959   G. H. MULLER   2,876,855
MOTOR VEHICLE DRIVELINE MOUNTING
Filed May 31, 1955   3 Sheets-Sheet 1
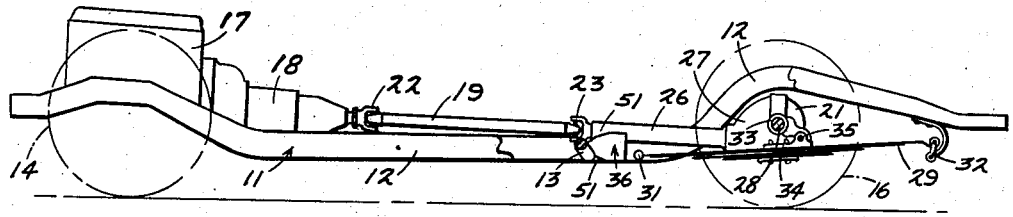
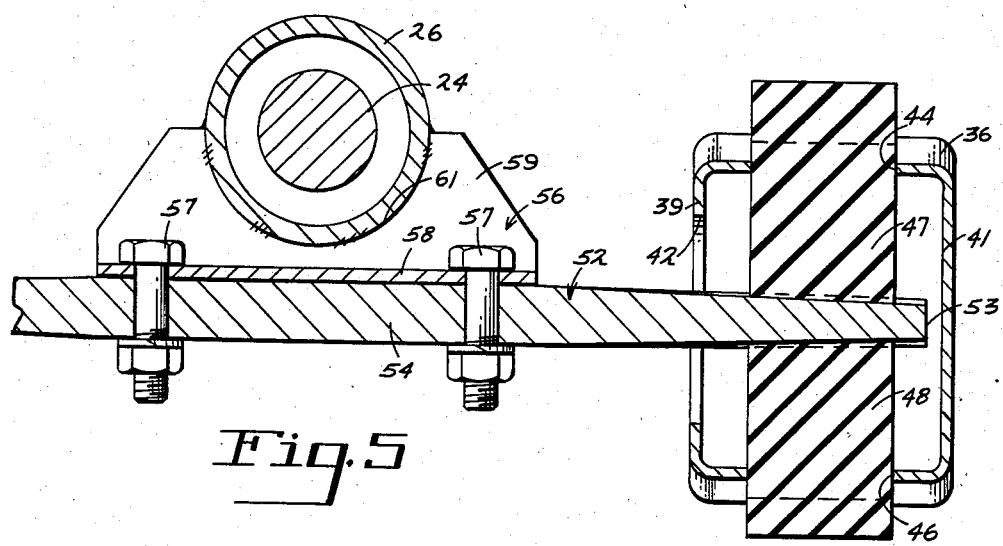
INVENTOR.
G. H. MULLER.
BY E.C. McRae,
J. R. Faulkner,
T. H. Oster,
ATTYS.

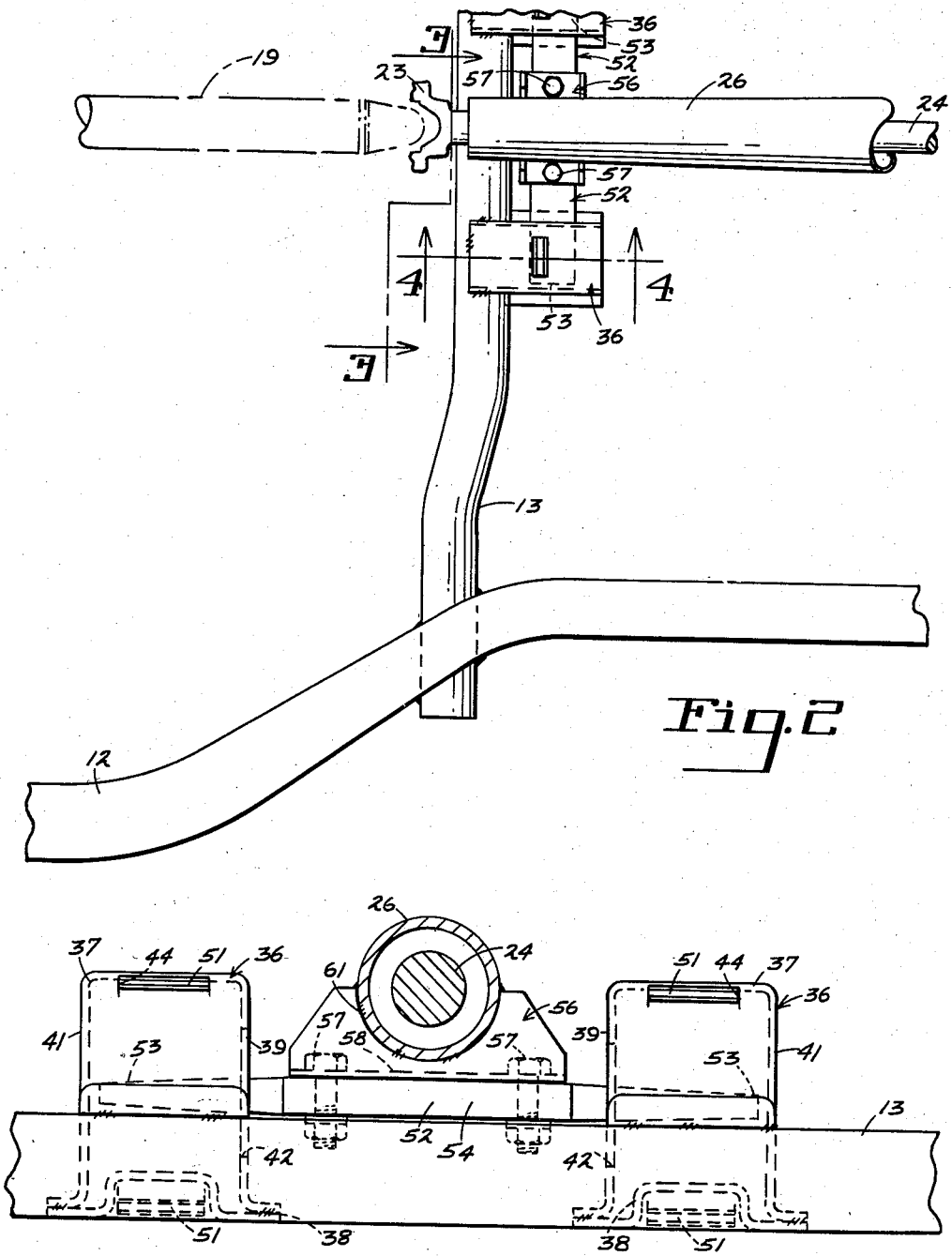

March 10, 1959 G. H. MULLER 2,876,855
MOTOR VEHICLE DRIVELINE MOUNTING
Filed May 31, 1955 3 Sheets-Sheet 3

INVENTOR.
G.H.MULLER.
BY E.C. McRae,
J.R. Faulkner,
J.H. Oster,
ATTYS.

United States Patent Office 2,876,855
Patented Mar. 10, 1959

2,876,855

MOTOR VEHICLE DRIVELINE MOUNTING

George H. Muller, Northville, Mich., assignor to Ford Motor Company, Dearborn, Mich., a corporation of Delaware Application May 31, 1955, Serial No. 512,234

4 Claims. (Cl. 180—70)

This invention relates generally to a motor vehicle driveline mounting arrangement and particularly to a driveline mounting for a motor vehicle utilizing a short torque member.

In an embodiment of the invention, the forward end of a torque tube rigidly connected to the rear axle housing of a motor vehicle is resiliently supported upon the vehicle frame by means of rubber mounts. A pair of mounting brackets are rigidly secured to a cross frame member on opposite sides of the forward portion of the torque tube, each mounting bracket being generally of box section and housing a pair of opposed generally vertically aligned rubber mounts secured to the upper and lower walls respectively of the bracket. The inboard walls of the mounting brackets are apertured to receive the opposite ends of a transversely extending flat supporting bar rigidly connected intermediate its ends to the forward end of the torque tube. The opposite ends of the supporting bar extend between the upper and lower rubber mounts of each mounting bracket with the mounts being under compression when the bar is assembled therebetween. The forward end of the torque tube is thus resiliently mounted and vertical deflection thereof is controlled to properly locate the driveline and permit proper road clearance while maintaining a minimum floor tunnel height. Antibrake lift for the rear wheels is also provided by this construction, and the spaced transverse mounts afford resistance against windup due to engine torque and thus has a stabilizing effect upon the suspension. By adding roll control to the rear suspension the mounting also permits lowering of the rear spring rate.

Other objects and advantages of this invention will be made more apparent as this description proceeds, particularly when considered in connection with the accompanying drawings, wherein:

Figure 1 is a side elevational view of a motor vehicle chassis incorporating the construction of the present invention.

Figure 2 is an enlarged plan view of a portion of a construction shown in Figure 1.

Figure 3 is a front elevational view of the construction shown in Figure 2, as viewed along the line 3—3 of Figure 2.

Figure 5 is a cross sectional view taken on the line 5—5 of Figure 4.

Figure 4:
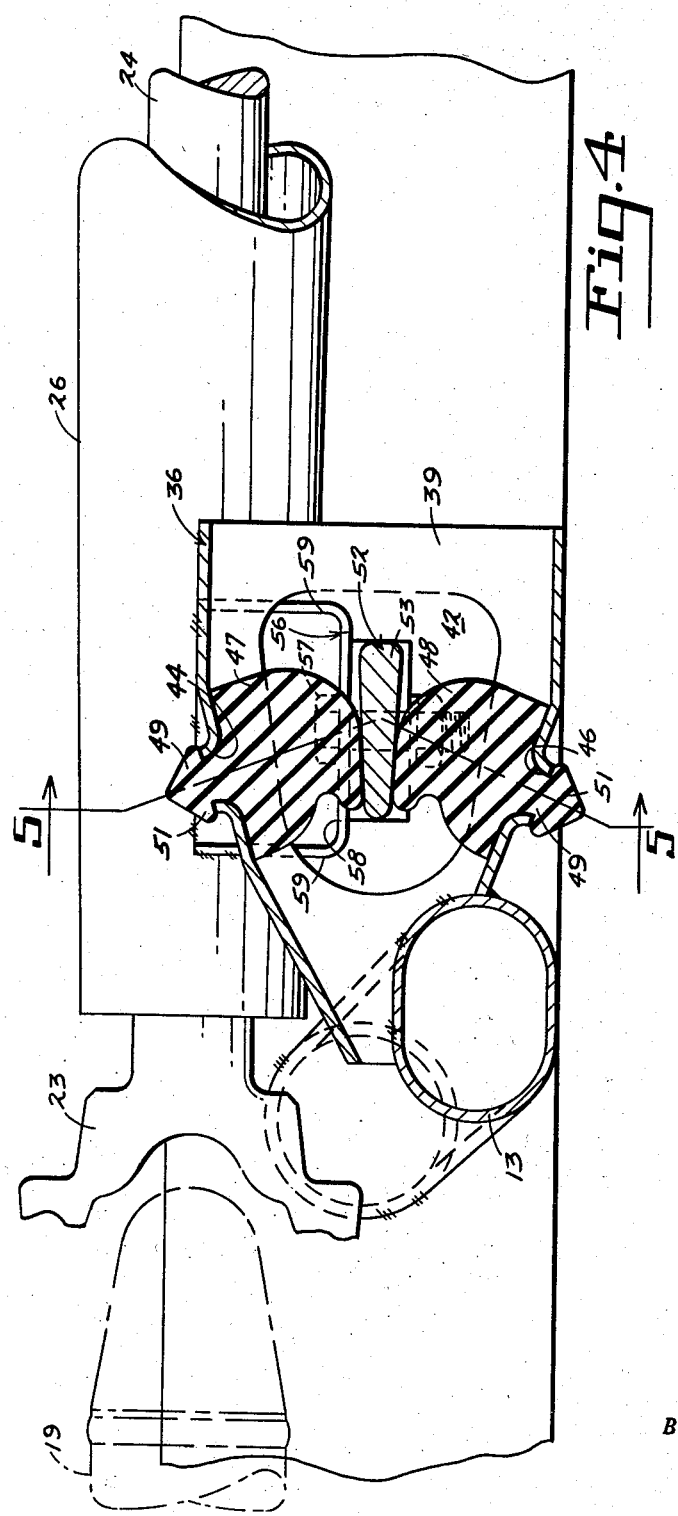
Figure 4 is a cross sectional view taken on the plane indicated by the line 4—4 of Figure 2.

Referring now to the drawings, and particularly to Figure 1, the reference character 11 indicates generally a motor vehicle chassis having side frame rails 12 and an intermediate tubular cross frame member 13. Front and rear road wheels 14 and 16 are provided, and the rear wheels 16 are driven by a power train including an engine 17, transmission 18, drive shaft 19, and rear axle assembly 21. A pair of universal joints 22 and 23 are provided, joint 22 being between the transmission 18 and the drive shaft 19 and joint 23 being between the drive shaft 19 and a shaft 24 journaled in the torque tube 26 secured to and extending forwardly from the rear axle housing 27. Shaft 24 is connected by conventional differential mechanism (not shown) within the rear axle housing 27 to axle shafts 28 operatively connected to the rear road wheels 16.

Longitudinally extending leaf springs 29 are provided for the rear wheels, being connected to the vehicle frame at their opposite ends by means of spring hangers 31 and 32, and being conventionally connected by spring seats 34 to the axle tubes 33 at intermediate points. A pivotal connection 35 is provided between the spring seat 34 and the axle tube 33 to permit pivotal movement about a horizontal transverse axis.

With reference now to Figures 2 to 5 inclusive, it will be noted that the tubular cross frame member 13 extends transversely of the vehicle between the side frame rails 12, with the opposite ends thereof being inserted through the side walls of the frame rails and welded thereto. The frame cross member 13 is located adjacent the forward end of the torque tube 26.

A pair of mounting brackets 36 are supported upon the frame cross member 13 at opposite sides of the torque tube 26, being spaced laterally therefrom equal distances. Each mounting bracket 36 is generally of box section and is constructed of a hat shaped upper section 37 and a bottom plate 38 having marginal flanges welded together to form a unit structure. The inboard and outboard side walls 39 and 41 respectively of the mounting bracket 36 are parallel to each other and lie in vertical planes extending longitudinally of the vehicle. The inboard side wall 39 is formed with an enlarged opening 42 therein for a purpose to be described hereinafter. The upper wall of the hat shaped section 37 and the bottom plate 38 are formed with transversely elongated flanged openings 44 and 46 therein. The rearward end of the box section mounting bracket 36 is open, and the forward end thereof is suitably welded to the tubular cross frame member 13.

A pair of molded or extruded rubber mounting members 47 and 48 are housed within each mounting bracket 36. As best seen in Figure 4, the rubber mounting members 47 and 48 are formed with narrow neck portions 49 and enlarged head portions 51 insertable through the elongated transverse openings 44 and 46 in the mounting bracket 36. When thus assembled, the rubber mounting members 47 and 48 are located generally in vertical alignment with each other, and are arranged with their central transverse planes located at an angle to the vertical and converging toward each other in a rearward direction.

A flat supporting bar 52 extends transversely of the vehicle between the mounting brackets 36. The opposite ends 53 of the supporting bars are tapered in an outboard direction as well as in a longitudinal direction and extend through the enlarged openings 42 formed in the inboard side walls 39 of the mounting brackets. The ends 53 of the supporting bar extend between the vertically spaced rubber mounting members 47 and 48 and when thus assembled place the mounting members under a predetermined compression.

The central portion 54 of the supporting bar 52 is of uniform thickness and extends transversely beneath the forward end of the torque tube 26. A U-shaped supporting bracket 56 is bolted to the central portion 54 by means of bolts 57, extending through the bottom wall 58 of the bracket. The side walls 59 of the supporting bracket are formed with semicircular cutouts 61 to receive the tubular torque tube 26, the latter being welded thereto.

Vertical deflection of the forward end of the torque tube 26 is controlled by the rubber mounting members 47 and 48 to not only locate the driveline vertically but also to dampen vibrations therein and to insulate the vehicle frame from such vibrations. The lateral spacing of the mounting brackets 36 and the rubber mounting members 47 and 48 on opposite sides of the torque tube 26 affords resistance to roll resulting from lower spring rate, and the fore and aft location of the mounting structure adjacent the forward end of the torque tube provides anti-brake lift or windup control for the rear wheels contributing to car leveling.

It will be understood that the invention is not to be limited to the exact construction shown and described, but that various changes and modifications may be made without departing from the spirit and scope of the invention, as defined in the appended claims.

What is claimed is:

1. A mounting for supporting a motor vehicle driveline upon a vehicle frame cross member, comprising a pair of mounting brackets rigidly secured to said frame cross member on opposite sides of said driveline, each of said mounting brackets having vertically spaced upper and lower walls, a pair of opposed of vertically aligned resilient elements carried by each of said mounting brackets between the upper and lower walls thereof, one element of each pair being secured to the upper wall of the adjacent bracket and the other being secured to the lower wall, the central transverse planes of said resilient members being located at an angle to the vertical and converging toward each other in a rearward direction to provide a variable deflection rate, a horizontally flat supporting member extending transversely of said vehicle between said mounting brackets, each end of said flat supporting member freely extending between the upper and lower resilient elements carried by one of said mounting brackets, and a supporting bracket secured to said supporting member intermediate said mounting brackets for supporting said driveline.

2. The structure defined by claim 1 which is further characterized in that each of said mounting brackets is box section in transverse cross section and is formed with an enlarged aperture in its side wall nearest the vehicle driveline to provide clearance for the insertion of the adjacent end of said supporting member into the mounting bracket and for the vertical movement of said end between said resilient elements, said resilient elements being under vertical compression when said horizontally flat supporting member is positioned therebetween.

3. In a motor vehicle having a frame and front and rear road wheels, a rear axle assembly between said rear wheels, a torque tube rigidly connected to said rear axle assembly and extending forwardly therefrom, a power driven drive shaft generally aligned with said torque tube, a second drive shaft within said torque tube, a universal joint interconnecting said drive shafts adjacent the forward end of said torque tube, a pair of mounting brackets secured to said vehicle frame on laterally opposite sides of said torque tube, a supporting bracket secured to the forward end of said torque tube in transverse alignment with said mounting brackets, an elongated bar centrally secured to said supporting bracket and having its opposite ends projecting laterally to said mounting brackets, and a pair of vertically spaced rubber mounts carried by each of said mounting brackets and embracing the adjacent end of said elongated bar, the central transverse planes of said rubber mounts being located at an angle to the vertical and converging toward each other in a rearward direction to provide a variable deflection rate, the ends of said elongated bar only being frictionally engaged between said rubber mounts.

4. In a motor vehicle having a frame and front and rear road wheels, a rear axle assembly between said rear wheels, a torque tube rigidly connected to said rear axle assembly and extending forwardly therefrom, a power driven drive shaft generally aligned with said torque tube, a second drive shaft within said torque tube, a universal joint interconnecting said drive shafts adjacent the forward end of said torque tube, a transversely extending frame cross member adjacent the forward end of said torque tube and extending beneath said torque tube, a laterally extending horizontally flat bar positioned beneath said torque tube and centrally secured to the forward end of said torque tube, a mounting bracket secured to said cross frame member adjacent each end of said flat bar and having upper and lower walls encompassing the adjacent bar end, upper and lower resilient elements secured respectively to the upper and lower walls of each mounting bracket and projecting toward each other with their adjacent portions in compressive engagement with the opposite sides of the adjacent end of said flat bar, the central transverse planes of said resilient member being located at an angle to the vertical and converging toward each other in a rearward direction to provide a variable deflection rate, the ends of said elongated bar only being frictionally engaged between said resilient members.

References Cited in the file of this patent

UNITED STATES PATENTS

| | | |
|---|---|---|
| 1,445,125 | Batenburg | Feb. 13, 1923 |
| 1,755,549 | Masury | Apr. 22, 1930 |
| 2,365,609 | Wahlberg | Dec. 19, 1944 |
| 2,465,785 | Berno | Mar. 29, 1949 |
| 2,776,174 | McMillan | Jan. 1, 1957 |

FOREIGN PATENTS

| | | |
|---|---|---|
| 580,779 | France | Sept. 10, 1924 |
| 27,032 | Great Britain | Nov. 19, 1914 |